(12) United States Patent
Bos (10) Patent No.: US 9,665,250 B2
(45) Date of Patent: May 30, 2017

(54) PORTABLE ELECTRONIC DEVICE AND METHOD OF CONTROLLING SAME

(75) Inventor: Jeffrey Charles Bos, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1373 days.

(21) Appl. No.: 13/022,450

(22) Filed: Feb. 7, 2011

(65) Prior Publication Data

US 2012/0204127 A1    Aug. 9, 2012

(51) Int. Cl.
  *G06F 3/0484*   (2013.01)
  *G06F 3/0354*   (2013.01)
  *G06F 3/0485*   (2013.01)

(52) U.S. Cl.
  CPC ...... *G06F 3/04842* (2013.01); *G06F 3/03549* (2013.01); *G06F 3/0485* (2013.01)

(58) Field of Classification Search
  CPC ....................................................... G06F 3/048
  USPC ....................................................... 715/784
  See application file for complete search history.

(56) References Cited

U.S. PATENT DOCUMENTS

| | | | | |
|---|---|---|---|---|
| 5,323,444 | A * | 6/1994 | Ertz et al. | 379/45 |
| 5,371,851 | A * | 12/1994 | Pieper et al. | 345/501 |
| 6,211,879 | B1 * | 4/2001 | Soohoo | 715/854 |
| 2004/0234315 | A1 * | 11/2004 | Colwell et al. | 400/489 |
| 2007/0120832 | A1 | 5/2007 | Saarinen et al. | |
| 2008/0036743 | A1 | 2/2008 | Westerman et al. | |
| 2009/0109182 | A1 | 4/2009 | Fyke et al. | |
| 2009/0187855 | A1 * | 7/2009 | Gruen et al. | 715/808 |
| 2009/0228792 | A1 | 9/2009 | Van Os et al. | |
| 2009/0228842 | A1 | 9/2009 | Westerman et al. | |
| 2009/0288043 | A1 * | 11/2009 | Willis | 715/859 |
| 2011/0310026 | A1 * | 12/2011 | Davis et al. | 345/173 |

FOREIGN PATENT DOCUMENTS

EP    1840707 A1    10/2007

OTHER PUBLICATIONS

Extended European Search Report dated Aug. 4, 2011, issued from the corresponding EP patent application No. 11153580.3.
http://kb.palm.com/wps/portal/kb/na/pre/p100eww/sprint/solutions/article/13171_en.html#N101F6—published Jun. 2009.
http://www.intomobile.com/2008/03/11/copy-and-paste-on-the-iphone.html—published Mar. 11, 2008.
http://www.lestsgomobile.org/en/0520/pantechpg6200/—published Jan. 10, 2007.
http://www.youtube.com/watch?v=HDcWFy_3zWA—published at least as early as Sep. 2010.
http://www.synaptics.com/about/press/press-releases/synaptics-demonstrates-new-touchpad%E2%84%A2-products-and-gesture-technology-comp—published Jun. 2, 2009.
http://www.swypeinc.com/product.html—published at least as early as Sep. 2010.
http://news.cnet.com/8301-11386_3-10252728-76.html—published Jun. 1, 2009.

(Continued)

*Primary Examiner* — Angie Badawi
(74) *Attorney, Agent, or Firm* — Borden Ladner Gervais LLP; Geoffrey deKleine (57) ABSTRACT

A method of selecting text when an indicator is in a text field includes: receiving a scrolling input at a navigation device; and selecting the text field when the scrolling input moves beyond a boundary of the text field at a location where a tab function is unavailable.

17 Claims, 7 Drawing Sheets

(56) References Cited

OTHER PUBLICATIONS http://technorati.com/videos/youtube.com%2Fwatch%3Fv%3DWzk9dhocPbw—published at least as early as Sep. 2010.
Examiner's Report dated Dec. 20, 2013, issued from the corresponding CA patent application No. 2,766,875.
Examiner's Report dated Dec. 1, 2014, issued from the corresponding CA patent application No. 2,766,875.
Office Action dated Oct. 16, 2015, issued from corresponding EP patent application No. 11153580.3.
Examiner's Report dated Oct. 27, 2015, issued from corresponding CA patent application No. 2,766,875.

* cited by examiner

PORTABLE ELECTRONIC DEVICE AND METHOD OF CONTROLLING SAME

TECHNICAL FIELD

The present disclosure relates to portable electronic devices including a navigation device and the control of such portable electronic devices.

BACKGROUND DISCUSSION

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities.

Portable electronic devices such as PDAs or smart telephones are generally intended for handheld use and ease of portability. Some handheld devices include a display, which may be a touch-sensitive display, that is operable with a navigation device to move an indicator, such as a cursor, and select available options. The information displayed on the displays may be modified depending on the functions and operations being performed. Improvements in portable electronic devices and methods of text selection are desirable.

BRIEF DESCRIPTION OF THE DRAWINGS

Embodiments of the present application will now be described, by way of example only, with reference to the attached Figures, wherein.

DETAILED DESCRIPTION

The following describes a portable electronic device and method of selecting text when an indicator is in a text field. The method includes: receiving a scrolling input at a navigation device; and selecting the text field when the scrolling input moves beyond a boundary of the text field at a location where a tab function is unavailable.

In another aspect there is provided a portable electronic device including: a display; a navigation device; and a processor operably coupled to the navigation device and display to detect a scrolling input at the navigation device and, when the indicator is in a text field and the scrolling input moves beyond a boundary of the text field, to select the text field when a tab function is unavailable.

In another aspect there is provided a method including: receiving a scrolling input at a navigation device; determining a location of an indicator on a display within one of a plurality of vertically arranged text fields; when the indicator is at a left boundary of a text field and the scrolling input moves generally to the left, selecting the text field; when the indicator is at a right boundary of the text field and the scrolling input moves generally to the right, selecting the text field.

In still another aspect there is provided a method including: receiving a scrolling input at a navigation device; determining a location of an indicator on a display within one of a plurality of horizontally arranged text fields; when the indicator is at a top boundary of a text field and the scrolling input moves generally up, selecting the text field; when the indicator is at a bottom boundary of the text field and the scrolling input moves generally down, selecting the text field.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smartphones, wireless organizers, personal digital assistants, wirelessly enabled notebook computers, and so forth. The portable electronic device may also be a portable electronic device without wireless communication capabilities, such as a handheld electronic game device, digital photograph album, digital camera, or other device.

Figure 1:
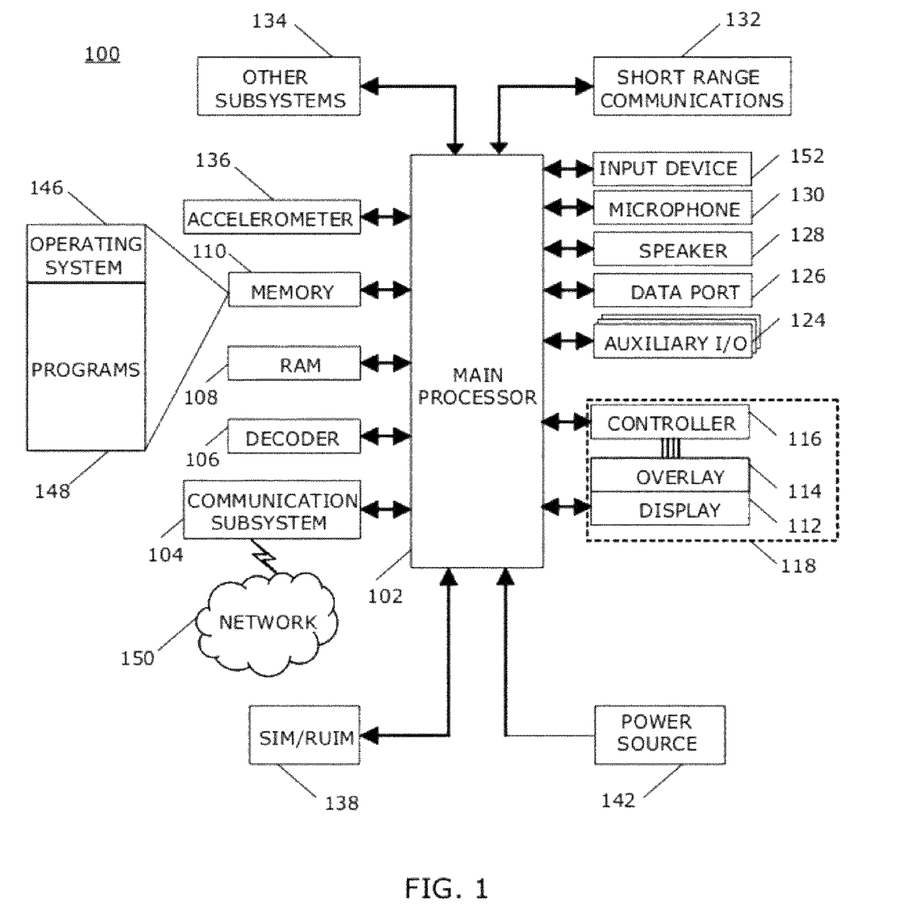
FIG. 1 is a simplified block diagram of one example of a portable electronic device in accordance with the present disclosure.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, an auxiliary input/output (I/O) subsystem 124, a data port 126, a speaker 128, a microphone 130, short-range communications 132, and other device subsystems 134. The processor 102 may optionally interact with one or more actuators (not shown) to provide tactile feedback and one or more force sensors (not shown) to detect a force imparted on the touch-sensitive display 118. Interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 that may be utilized to detect direction of gravitational forces or gravity-induced reaction forces.

The processor 102 also interacts with a navigation device 140 that may be, for example, a touch-sensitive track pad, a trackball, an optical joystick, and so forth, to interface with a user to provide input. The navigation device 140 may be utilized, for example, to navigate through information on a display, control a cursor or other indicator, edit information, and so forth. In the examples shown, the navigation device 140 is located near the touch-sensitive display 118 or LCD display. "Input" as utilized hereinafter refers to gestures or other contact applied to the navigation device 140 or the interpretation of the gesture or contact by the navigation device 140.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The touch-sensitive display 118 is also configured to detect a gesture. A gesture, such as a swipe, is a type of touch, that begins at an origin point and continues to a finishing point while touch contact is maintained. A swipe may be long or short in distance, or duration, or both distance and duration. Two points of the swipe may be utilized to determine a vector that describes a direction of the swipe. The direction may be referenced with respect to the touch-sensitive display 118, the orientation of the information displayed on the touch-sensitive display 118, or another reference. For the purposes of providing a reference, "horizontal" as utilized herein is substantially left-to-right or right-to-left relative to the orientation of the displayed information, and "vertical" as utilized herein is substantially upward or downward relative to the orientation of the displayed information. The origin point and the finishing point of the swipe may be utilized to determine the magnitude or distance of the swipe. The duration of the swipe may be determined from the origin point and finishing point of the swipe in time. The processor 102 receives data from the controller 116 to determine the direction, magnitude, and duration of the swipe. The gesture may be tracked and a plurality of sub-vectors determined for each gesture. The final sub-vector may be utilized to determine a distance and duration of a final portion of the gesture. The processor 102 receives data from the controller 116 to determine the speed of the swipe based on the distance and duration of the final portion of the gesture.

Similar to the touch-sensitive display 118, the navigation device 140 is also configured to detect touches and gestures. The processor 102 receives data from the navigation device 140, which receives user input. When the user input is a scrolling input, the processor 102 determines at least the direction of the scrolling input. When the navigation device 140 is a touch-sensitive track pad or an optical joystick, the scrolling input is generally a swipe gesture; when the navigation device 140 is a trackball, the scrolling input is generally a spin of the trackball. The portable electronic device may include other types of navigation devices capable of receiving gesture input.

Figure 2:
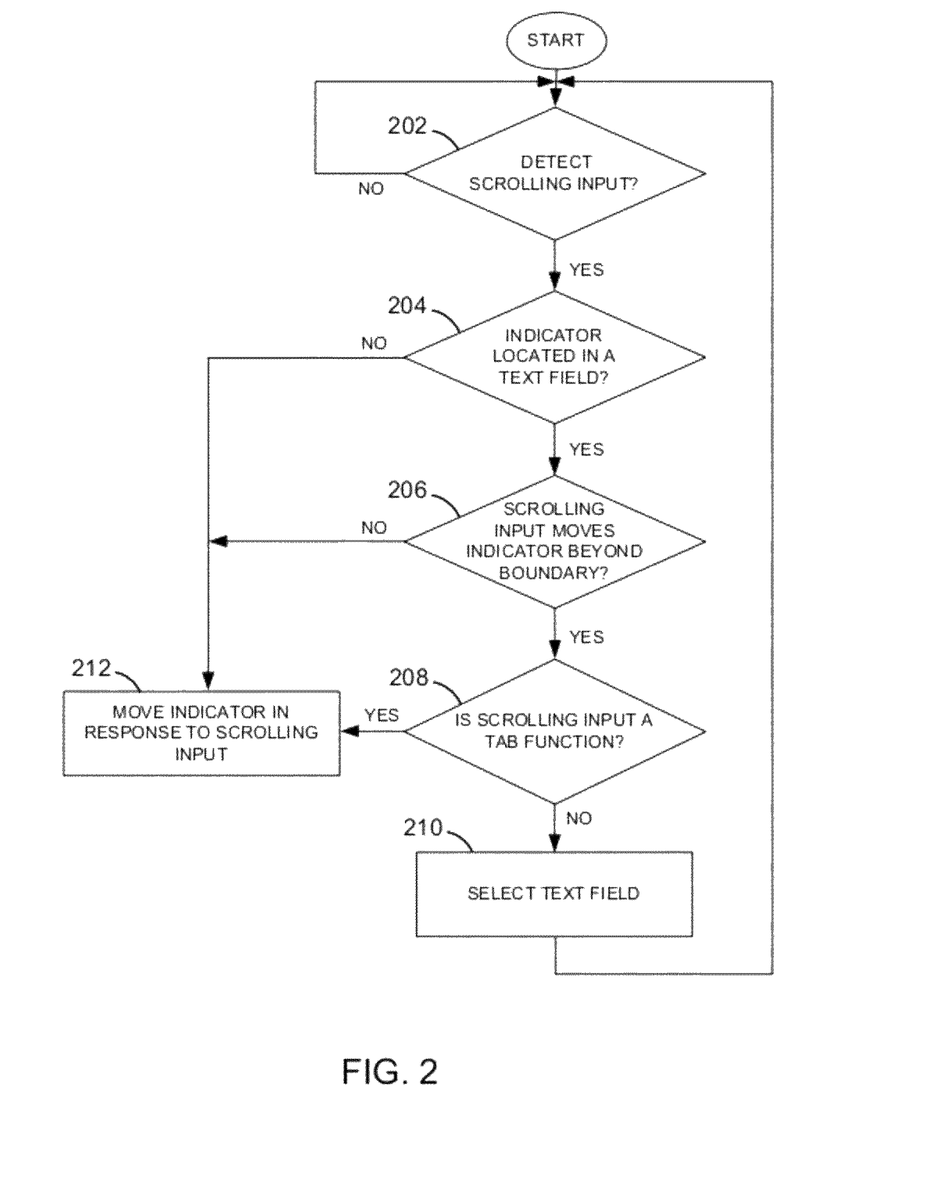
FIG. 2 is a flowchart illustrating an example of a method of selecting a text field in accordance with the present disclosure.

FIG. 2 is a flowchart illustrating an example of a method of selecting a text field. The method may be carried out by software executed by, for example, the processor 102. Coding of software for carrying out such a method is within the scope of a person of ordinary skill in the art given the present description. The method may contain additional or fewer processes than shown and described, and may be performed in a different order. Computer-readable code executable by, for example, the processor 102 of the portable electronic device 100 to perform the method, may be stored in a computer-readable medium.

When a scrolling input is detected 202 on a navigation device 140, a location of an indicator on a display is determined. When the indicator is not located in a text field 204, the indicator moves 212 in response to the scrolling input. When the indicator is located in a text field 204, the method continues at 206. When the scrolling input moves the indicator beyond a boundary of the text field 206, the processor 102 determines 208 if the scrolling input is a tab function, which moves the indicator to an adjacent text field. When the scrolling input is a tab function, the indicator is moved in response to the scrolling input 212. When the scrolling input is not a tab function, the text field is selected 210.

In general, a text field includes four boundaries: top, bottom, left and right. The left boundary of a multi-line text field occurs at the beginning of the text field, before the first character. Similarly, the right boundary of a multi-line text field occurs at the end of the text field, following the last character. The top boundary occurs at any location along the top line of the text field and the bottom boundary occurs at any location along the bottom line of the text field. Where the text field is one line, the top and bottom boundaries are the same.

On portable electronic devices, text fields may be arranged vertically or horizontally. When the text fields are arranged vertically, movement between text fields may be achieved by scrolling down from the bottom line of the text field to execute a tab function or scrolling up from the top line of the text field to execute a tab function. When the text fields are arranged horizontally, movement between text fields may be achieved by scrolling left from the left boundary of the text field to execute a tab function or scrolling right from the right boundary of the text field to execute a tab function.

Figure 3:
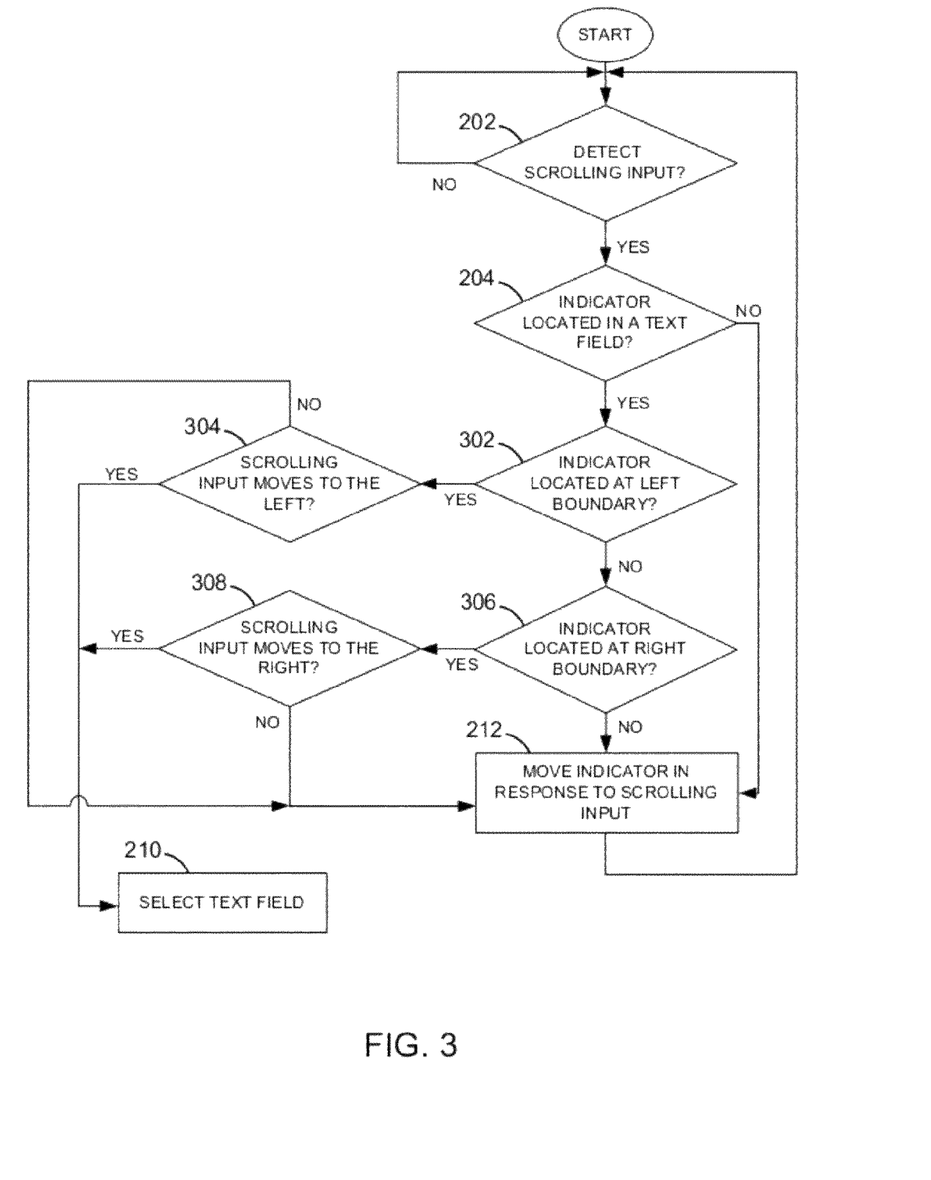
FIG. 3 is a flowchart illustrating an example of a method of selecting a text field in accordance with the present disclosure.

FIG. 3, illustrates an example of a method of selecting a text field within a plurality of vertically arranged text fields. When a scrolling input is detected 202 on a navigation device 140, a location of an indicator on a display is determined. When the indicator is not located in a text field 204, the indicator moves 314 in response to the scrolling input. When the indicator is located in a text field 204, the method continues at 302. When the indicator is located at the left boundary of the text field 302 and the scrolling input moves 304 to the left, the text field is selected 210. When the indicator is not located at the left boundary of the text field 302 but is located at the right boundary of the text field 306 and the scrolling input moves 308 to the right, the text field is selected 210.

When the indicator is located in the text field at a location other than the left boundary or the right boundary, the indicator moves 212 in response to the scrolling input. When the indicator is located at the left boundary of the text field 302 and the scrolling input does not move 304 to the left, the indicator moves 212 in response to the scrolling input. Similarly, if the indicator is located at the right boundary of the text field 306 and the scrolling input does not move 308 to the right, the indicator moves 212 in response to the scrolling input. Movement in response to scrolling input includes moving the indicator within the text field and executing a tab function to move the indicator to an adjacent text field.

Figure 4:
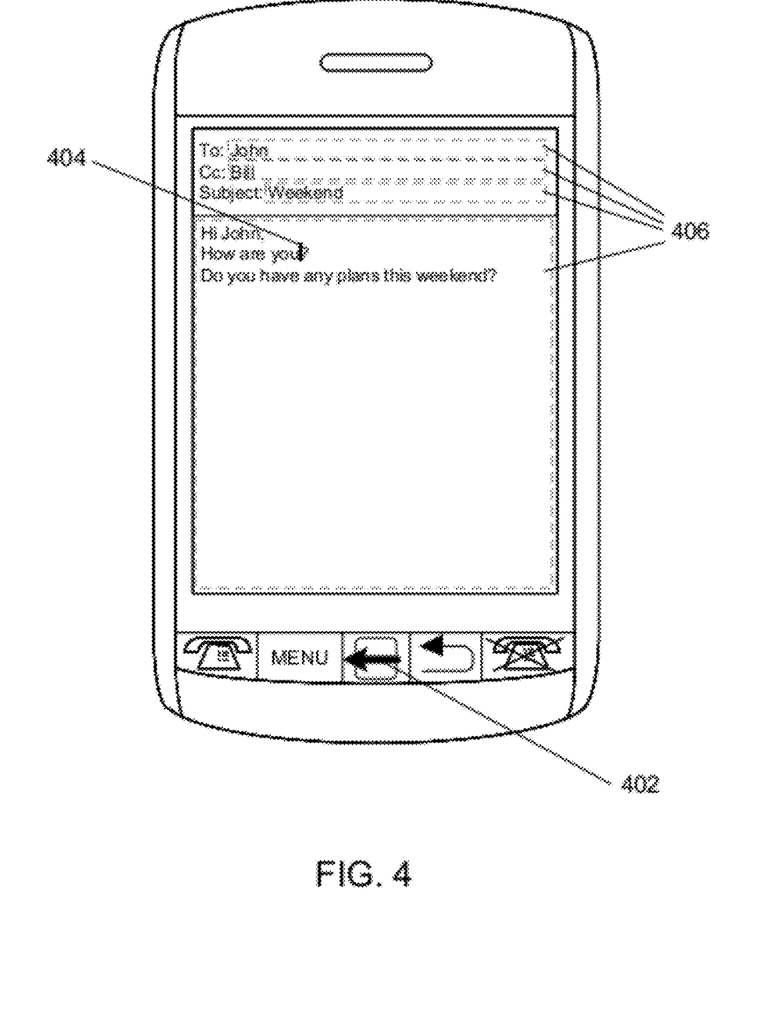
FIG. 4 illustrates an example of a portable electronic device receiving a gesture.
Figure 5:
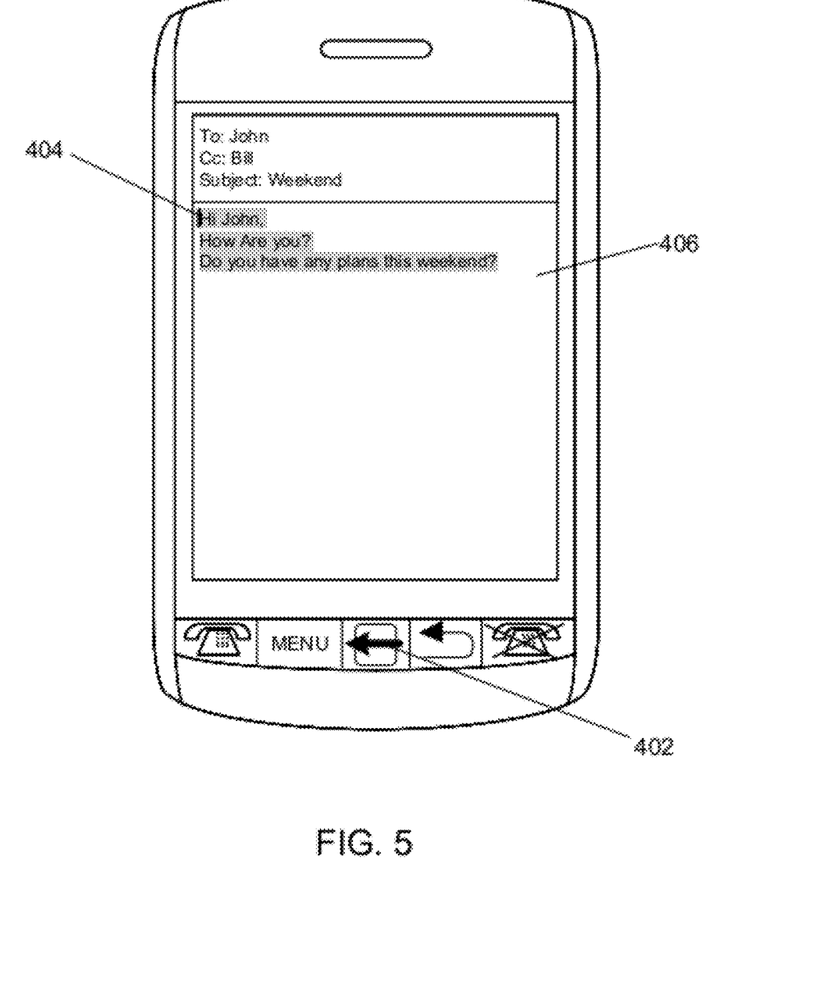
FIG. 5 through FIG. 7 illustrate examples of a portable electronic device receiving a gesture and performing an associated operation.
Figure 6:
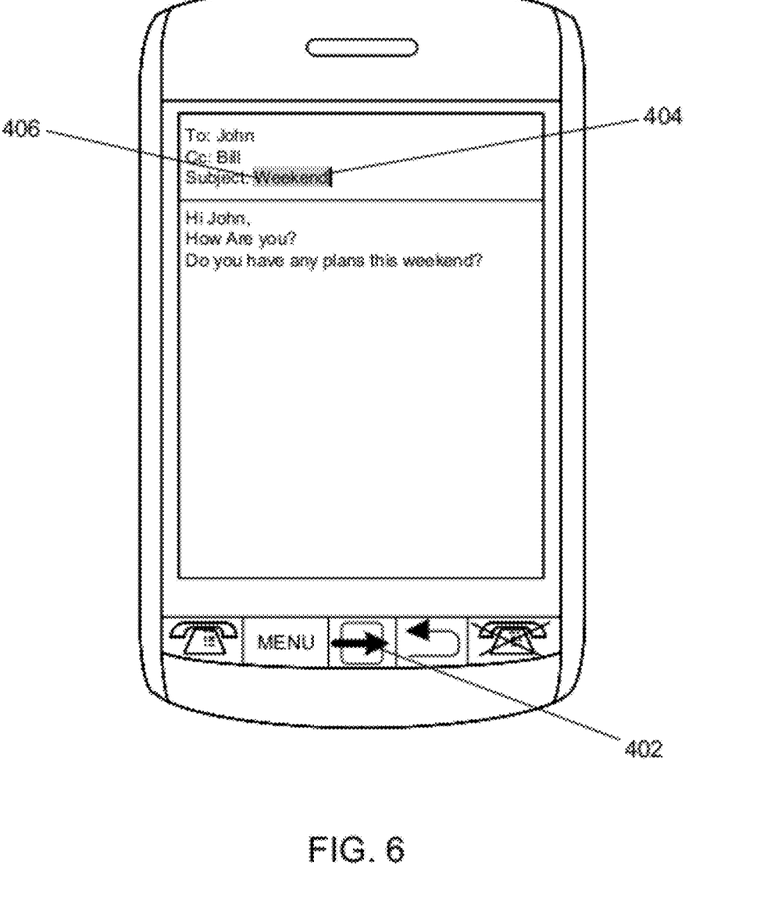
Figure 7:
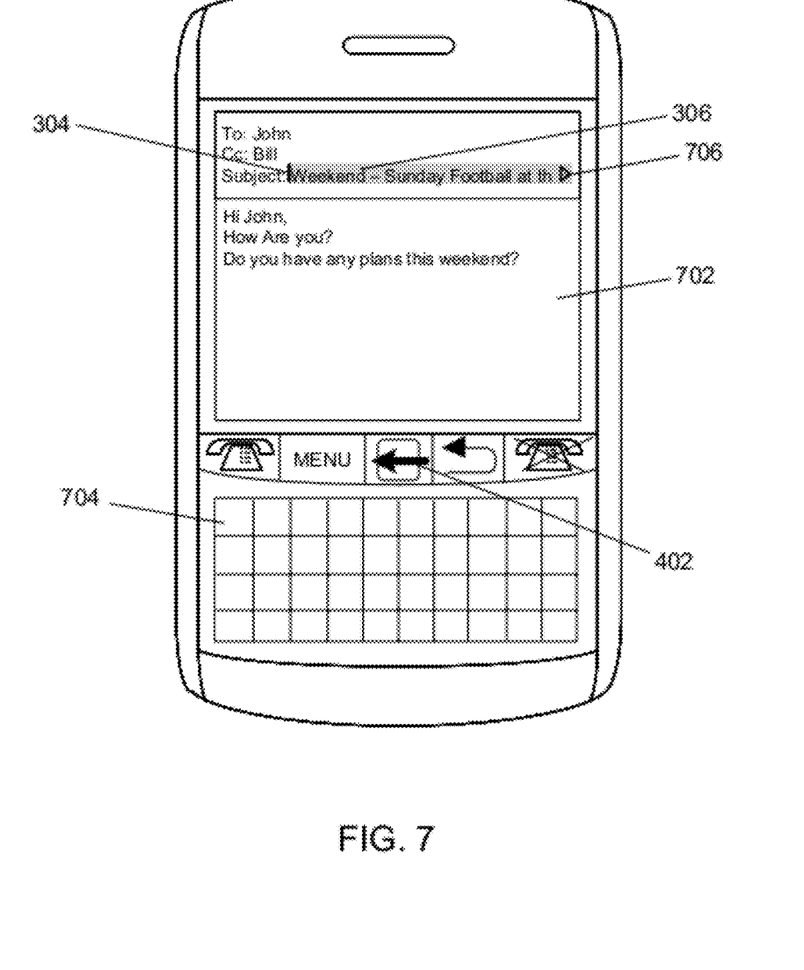

Referring now to FIG. 4. FIG. 5, FIG. 6 and FIG. 7, examples of a portable electronic device receiving a scrolling input are shown. In the example of FIG. 4, a scrolling input is detected 202. The scrolling input is shown, for the purpose of illustration, by the arrow 402. When the scrolling input is detected 202, the location of the indicator 404 in the text field 406 is determined. In the example of FIG. 4, the indicator 404 is located generally in the middle of the text of the text field 406, which is the body of an email message. In this example, because the indicator 404 is not located at the left boundary or the right boundary of the text field 406, the indicator moves 212 in response to the scrolling input. Because the arrow 402, and hence the scrolling input, is directed toward the left side of the display, the indicator moves to the left.

In the example of FIG. 5, a scrolling input is detected 202. The scrolling input is shown, for the purpose of illustration, by the arrow 402. When the scrolling input is detected 202, the location of the indicator 404 in the text field 406 is determined. As shown, the indicator 404 is located at the left boundary of text field of the body of an email message. Because the indicator 404 is located at the beginning of the text field and the scrolling input is directed toward the left, the text in the text field 406 is selected 210. The text selection is indicated to the user by highlighting the text field 406, as shown.

In the example of FIG. 6, a scrolling input is detected 202. The scrolling input is shown, for the purpose of illustration, by the arrow 402. When the scrolling input is detected 202, the location of the indicator 404 in the text field 406 is determined. As shown, the indicator 404 is located at the right boundary of the text field 406 of the subject of an email message. Because the indicator 404 is located at the right boundary of the text field and the scrolling input is directed toward the right, the text in the text field 406 is selected 210. The text selection is indicated to the user by highlighting the text field 406, as shown.

In the example of FIG. 7, the portable electronic device is of the type having an LCD display 702 and a keyboard 704. When a scrolling input, which is indicated by the arrow 402, is detected 202, the location of the indicator 404 in the text field 306 is determined. As shown, the indicator 404 is located at the left boundary of the text field 406 of the subject of an email message. Because the indicator 404 is located at the left boundary of the text field 406 and the scrolling input is directed toward the left, the text in the text field 406 is selected 210. The text selection is indicated to the user by highlighting the text field 406, as shown.

In one embodiment, a line is provided around the perimeter of the text field to indicate to the user that all text in the text field has been selected. The line may be blue or another color that is easily visible to the user. The line may be provided alone or in combination with highlighting. Further, when a portion of the text field is displayed, an arrow 706, which is shown in FIG. 7 by way of example, may be provided to indicate that text that is not displayed has been selected. This may be useful for text fields that are large so that the full text field does not fit on the display.

The method of FIG. 2 may be implemented when the text fields are arranged vertically or horizontally. A "select all" operation for selecting text in a text field may be executed by scrolling beyond a boundary of a text field at a location where a tab function is not available.

The method of FIG. 3 is generally implemented when the text fields are arranged vertically. The "select all" operation for selecting text in a text field may be executed by (i) locating the indicator at the left boundary of the text field and scrolling to the left using a navigation device or (ii) locating the indicator at the right boundary of the text field and scrolling to the right using the navigation device.

In another embodiment, the text fields may be arranged horizontally and the "select all" operation may be executed by (i) locating the indicator at the top boundary of the text field and scrolling up using a navigation device or (ii)

locating the indicator at the bottom boundary of the text field and scrolling down using the navigation device.

Executing the "select all" operation by inputting a left/right scrolling input when the text fields are arranged vertically and an up/down scrolling input when the text fields are arranged horizontally avoids gesture ambiguity between the "select all" operation and a tab operation, which moves the indicator from one text field to another.

An advantage of the method of selecting text in a text field is that the method includes a distinct gesture. For example, when the indicator is at the beginning of the text field in a vertically stacked text box arrangement, the user generally would not expect an operation to be executed by scrolling to the left. Because the gesture is simple and distinct from other gestures, the "select all" gesture may be readily adopted by users.

A further advantage of the method of selecting text in a text field is that the text in the text field may be selected without pressing an additional key, such as SHIFT, for example. Therefore, the user may execute the "select all" operation using one hand. One handed selection may be more efficient and further may have ergonomic advantages.

By providing a method for selecting text in a text field that is efficient, copy, paste and clear operations may be efficiently executed facilitating amendment and correction of fields, for example, reducing device use time and decreasing power requirements.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method of selecting text displayed on a display of an electronic device, comprising:
    in response to receiving a scrolling input at a navigation device of the electronic device when an indicator is located in a text field including a plurality of strings and a plurality of spaces entered therein such that the strings are separated by the spaces, the text field comprising left, right, top and bottom boundaries and the indicator is not located adjacent to one or more of the left, right, top and bottom boundaries, scrolling the indicator through the text field without selecting any of the strings or spaces;
    in response to receiving a single scrolling input at a navigation device of the electronic device when the indicator is located adjacent to one or more of the left, right, top and bottom boundaries:
        identifying a direction of the scrolling input, the direction being toward the one of the one or more of the left, right, top and bottom boundaries that the indicator is adjacent to;
        determining, at a processor of the electronic device, if an adjacent text field is present adjacent to the text field in the direction of the single scrolling input;
        identifying the single scrolling input as a tab function to move the indicator from the text field to the adjacent text field when the adjacent text field is present and moving the indicator from the text field to the adjacent text field in response to receipt of the single scrolling input;
        determining that the single scrolling input is not a tab function when no adjacent text field is present; and
    in response to receiving the single scrolling input when the indicator is located adjacent to one or more of the left, right, top and bottom boundaries, identifying the direction of the single scrolling input as toward the one or more of the left, right, top and bottom boundaries, and determining that the single scrolling input is not a tab function:
        selecting all characters of the text field wherein no strings or spaces are selected prior to receipt of the single scrolling input and all of the plurality of strings and the plurality of spaces in the text field are selected in response to the single scrolling input toward the one or more of the left, right, top and bottom boundaries adjacent the indicator, such that no characters in the text field are selected in response to a scrolling input to cause the indicator to scroll through the text field and all characters in the text field are selected in response to a single scrolling input when the indicator abuts a boundary of the text field and no adjacent field is present.

2. A method as claimed in claim 1, wherein the one or more of the left, right, top and bottom boundaries is a left boundary at a beginning of the text field and the single scrolling input moves to the left.

3. A method as claimed in claim 1, wherein the one or more of the left, right, top and bottom boundaries is a right boundary at an end of the text field and the single scrolling input moves to the right.

4. A method as claimed in claim 1, wherein the one or more of the left, right, top and bottom boundaries is a top boundary and the single scrolling input moves up.

5. A method as claimed in claim 1, wherein the one or more of the left, right, top and bottom boundaries is a bottom boundary and the single scrolling input moves down.

6. A method as claimed in claim 1, wherein the navigation device comprises one of a touch-sensitive track pad, a trackball, and an optical joystick.

7. A method as claimed in claim 1, wherein selecting all characters of the text field comprises highlighting all characters of the text field.

8. A method as claimed in claim 1, wherein when a portion of the text field is displayed, an arrow indicates that text not displayed has been selected.

9. A method as claimed in claim 1, wherein the indicator is movable to any one of a plurality of text fields.

10. A method as claimed in claim 1, wherein the display is a touch-sensitive display.

11. A method as claimed in claim 1, wherein the display is a Liquid Crystal Display (LCD).

12. A non-transitory computer-readable medium having computer-readable code executable by at least one processor of a portable electronic device to;
    in response to receiving a scrolling input at a navigation device of the electronic device when an indicator is located in a text field including a plurality of strings and a plurality of spaces entered therein such that the strings are separated by the spaces, the text field comprising left, right, top and bottom boundaries and the indicator is not located adjacent to one or more of the left, right, top and bottom boundaries, scrolling the indicator through the text field without selecting any of the strings or spaces;

in response to receiving a single scrolling input at a navigation device of the electronic device when the indicator is located adjacent to one or more of the left, right, top and bottom boundaries:
  identifying a direction of the scrolling input, the direction being toward the one of the one or more of the left, right, top and bottom boundaries that the indicator is adjacent to;
  determining, at a processor of the electronic device, if an adjacent text field is present adjacent to the text field in the direction of the single scrolling input;
  identifying the single scrolling input as a tab function to move the indicator from the text field to the adjacent text field when the adjacent text field is present and moving the indicator from the text field to the adjacent text field in response to receipt of the single scrolling input;
  determining that the single scrolling input is not a tab function when no adjacent text field is present; and
  in response to receiving the single scrolling input when the indicator is located adjacent to one or more of the left, right, top and bottom boundaries, identifying the direction of the single scrolling input as toward the one or more of the left, right, top and bottom boundaries, and determining that the single scrolling input is not a tab function:
    selecting all characters of the text field wherein no strings or spaces are selected prior to receipt of the single scrolling input and all of the plurality of strings and the plurality of spaces in the text field are selected in response to the single scrolling input toward the one or more of the left, right, top and bottom boundaries adjacent the indicator, such that no characters in the text field are selected in response to a scrolling input to cause the indicator to scroll through the text field and all characters in the text field are selected in response to a single scrolling input when the indicator abuts a boundary of the text field and no adjacent field is present.

13. A portable electronic device comprising:
  a display operable to display a text field including a plurality of strings and a plurality of spaces entered therein such that the strings are separated by the spaces, the text field comprising left, right, top and bottom boundaries;
  a navigation device operable to move an indicator, the indicator within the text field and to a location adjacent to one or more of the left, right, top and bottom boundaries of the text field; and
  a processor operably coupled to the navigation device and display to:
    detect a single scrolling input and identify a direction of the single scrolling input,
    in response to detecting the single scrolling input when the indicator is located in the text field and the indicator is not located adjacent to one or more of the left, right, top and bottom boundaries, scroll the indicator through the text field without selecting any of the strings or spaces,
    in response to receiving a single scrolling input at the navigation device of the electronic device when the indicator is located adjacent to one or more of the left, right, top and bottom boundaries and the direction is toward the one or more of the left, right, top and bottom boundaries that the indicator is adjacent to:
      determine that the single scrolling input is a tab function to move the indicator from the text field to an adjacent text field when an adjacent text field is present and move the indicator from the text field to the adjacent text field,
      determine that the single scrolling input is not a tab function when no adjacent text field is present and, select all characters of the text field wherein no strings or spaces are selected prior to receipt of the single scrolling input and all of the plurality of strings and the plurality of spaces in the text field are selected in response to the single scrolling input toward the one or more of the left, right, top and bottom boundaries adjacent the indicator, such that no characters in the text field are selected in response to a scrolling input to cause the indicator to scroll through the text field and all characters in the text field are selected in response to a single scrolling input when the indicator abuts a boundary of the text field and no adjacent field is present.

14. A portable electronic device as claimed in claim 13, wherein the one or more of the left, right, top and bottom boundaries is a left boundary at a beginning of the text field and the single scrolling input moves to the left.

15. A portable electronic device as claimed in claim 13, wherein the one or more of the left, right, top and bottom boundaries is a right boundary at an end of the text field and the single scrolling input moves to the right.

16. A portable electronic device as claimed in claim 13, wherein the one or more of the left, right, top and bottom boundaries is a top boundary and the single scrolling input moves up.

17. A portable electronic device as claimed in claim 13, wherein the one or more of the left, right, top and bottom boundaries is a bottom boundary and the single scrolling input moves down.

* * * * *